(12) United States Patent
Kajiya et al.

(10) Patent No.: US 11,789,182 B2
(45) Date of Patent: *Oct. 17, 2023

(54) MICRO CONCAVE-CONVEX STRUCTURE FOR OPTICAL BODY AND DISPLAY DEVICE

(71) Applicant: DEXERIALS CORPORATION, Tokyo (JP)

(72) Inventors: Shunichi Kajiya, Tokyo (JP); Asahiko Nogami, Tokyo (JP); Kyoko Sakurai, Tokyo (JP); Kazuya Hayashibe, Tokyo (JP)

(73) Assignee: DEXERIALS CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/691,527

(22) Filed: Mar. 10, 2022

(65) Prior Publication Data

US 2022/0196884 A1 Jun. 23, 2022

Related U.S. Application Data

(63) Continuation of application No. 15/771,960, filed as application No. PCT/JP2016/079542 on Oct. 4, 2016, now Pat. No. 11,307,328.

(30) Foreign Application Priority Data

Oct. 30, 2015 (JP) .................... 2015-215135

(51) Int. Cl.
  *G02B 1/118* (2015.01)
(52) U.S. Cl.
  CPC .................... *G02B 1/118* (2013.01)

(58) Field of Classification Search
  CPC ...... G02B 1/118; G02B 5/0257; G02B 5/021; G02B 5/0268; G02B 5/0278; G02B 5/0294
  See application file for complete search history.

(56) References Cited

U.S. PATENT DOCUMENTS 6,292,294 B1 9/2001 Takahashi et al.
7,016,111 B2 3/2006 Chubachi et al.
(Continued)

FOREIGN PATENT DOCUMENTS

JP 2009-230045 A 10/2009
JP 2009-258751 A 11/2009
(Continued)

OTHER PUBLICATIONS

Oct. 25, 2019, Taiwanese Office Action issued for related TW Application No. 105132820.
(Continued)

*Primary Examiner* — Bao-Luan Q Le
(74) *Attorney, Agent, or Firm* — Paratus Law Group, PLLC

(57) ABSTRACT

There is provided an optical body and a display device that enable wavelength dependence of a reflectance to be reduced and reflection of incident light to be further suppressed, the optical body including: a concave-convex structure formed on a surface of a base material. An average period of concavities and convexities of the concave-convex structure is equal to or shorter than a wavelength belonging to a visible light band. A standard deviation of differences between respective positions of bottom faces of the concavities of the concave-convex structure in a normal direction of a flat surface of the base material and a median of the positions of the bottom faces is greater than or equal to 25 nm.

9 Claims, 12 Drawing Sheets

(56) References Cited

U.S. PATENT DOCUMENTS

| | | |
|---|---|---|
| 7,019,899 B2 | 3/2006 | Chubachi et al. |
| 7,190,516 B2 | 3/2007 | Chubachi et al. |
| 7,297,386 B2 | 11/2007 | Suzuki et al. |
| 8,547,639 B2 | 10/2013 | Watanabe et al. |
| 8,747,683 B2 | 6/2014 | Isurugi et al. |
| 9,025,250 B2 | 5/2015 | Minoura et al. |
| 9,158,040 B2 | 10/2015 | Kamiyama et al. |
| 9,291,754 B2 | 3/2016 | Masuyama et al. |
| 9,389,340 B2 | 7/2016 | Imaoku et al. |
| 9,442,222 B2 | 9/2016 | Fukui et al. |
| 9,511,552 B2 | 12/2016 | Toriyama et al. |
| 9,678,248 B2 | 6/2017 | Fukui et al. |
| 9,823,392 B2 | 11/2017 | Masuyama et al. |
| 2001/0050812 A1 | 12/2001 | Takahashi et al. |
| 2004/0196551 A1 | 10/2004 | Chubachi et al. |
| 2005/0074579 A1 | 4/2005 | Suzuki et al. |
| 2005/0219691 A1 | 10/2005 | Chubachi et al. |
| 2006/0158726 A1 | 7/2006 | Chubachi et al. |
| 2009/0194914 A1 | 8/2009 | Uozu et al. |
| 2010/0165276 A1 | 7/2010 | David et al. |
| 2010/0177398 A1 | 7/2010 | Watanabe et al. |
| 2011/0003121 A1 | 1/2011 | Tsuda |
| 2011/0281068 A1 | 11/2011 | David et al. |
| 2011/0317270 A1 | 12/2011 | Minoura et al. |
| 2012/0176681 A1 | 7/2012 | Chang et al. |
| 2012/0196090 A1 | 8/2012 | Isurugi et al. |
| 2012/0234794 A1 | 9/2012 | Isurugi et al. |
| 2012/0281292 A1 | 11/2012 | Baca et al. |
| 2013/0038939 A1 | 2/2013 | Walker, Jr. et al. |
| 2013/0215513 A1 | 8/2013 | Liang et al. |
| 2013/0299796 A1 | 11/2013 | Masuyama et al. |
| 2014/0320970 A1 | 10/2014 | Kamiyam et al. |
| 2015/0028325 A1 | 1/2015 | Seki et al. |
| 2015/0037535 A1 | 2/2015 | Akimoto et al. |
| 2015/0049389 A1 | 2/2015 | Minoura et al. |
| 2015/0056412 A1 | 2/2015 | Yu et al. |
| 2015/0076468 A1 | 3/2015 | Yamaguchi et al. |
| 2015/0077854 A1 | 3/2015 | Yu et al. |
| 2015/0103226 A1 | 4/2015 | Takahashi et al. |
| 2015/0103396 A1 | 4/2015 | Zollars et al. |
| 2015/0160377 A1 | 6/2015 | Kuroda et al. |
| 2015/0168609 A1 | 6/2015 | Fukui et al. |
| 2015/0168610 A1 | 6/2015 | Fukui et al. |
| 2015/0192703 A1 | 7/2015 | Shim |
| 2015/0202829 A1 | 7/2015 | Toriyama et al. |
| 2015/0301230 A1 | 10/2015 | Dai et al. |
| 2015/0337494 A1 | 11/2015 | Takahashi et al. |
| 2016/0327695 A1 | 11/2016 | Masuyama et al. |
| 2017/0146696 A1 | 5/2017 | Hongo et al. |
| 2017/0299778 A1 | 10/2017 | Kajiya et al. |
| 2019/0160768 A1 | 5/2019 | Kajiya |

FOREIGN PATENT DOCUMENTS

| | | |
|---|---|---|
| JP | 2012-118501 A | 6/2012 |
| JP | 2012-216084 A | 11/2012 |
| JP | 2013-061612 A | 4/2013 |
| JP | 2013-109228 A | 6/2013 |
| JP | 2013-254026 A | 12/2013 |
| JP | 2014-002322 A | 1/2014 |
| JP | 2014-002326 A | 1/2014 |
| JP | 2014-139667 A | 7/2014 |
| WO | WO 2013/191092 A1 | 12/2013 |

OTHER PUBLICATIONS

Oct. 1, 2019, Japanese Office Action issued for related JP Application No. 2015-215135.

Jan. 20, 2021, Taiwanese Office Action issued for related TW application No. 105132820.

Jul. 1, 2020, Taiwanese Office Action issued for related TW application No. 105132820.

MICRO CONCAVE-CONVEX STRUCTURE FOR OPTICAL BODY AND DISPLAY DEVICE

CROSS REFERENCE TO PRIOR APPLICATION

This application is a continuation of U.S. patent application Ser. No. 15/771,960 (filed on Apr. 27, 2018), which is a National Stage Patent Application of PCT International Patent Application No. PCT/JP2016/079542 (filed on Oct. 4, 2016) under 35 U.S.C. § 371, which claims priority to Japanese Patent Application No. 2015-215135 (filed on Oct. 30, 2015), which are all hereby incorporated by reference in their entirety.

TECHNICAL FIELD

The present invention relates to an optical body and a display device.

BACKGROUND ART

Optical bodies having various characteristics are generally provided on a surface on which light is incident in a display device such as a television and an optical element such as a camera lens for the purpose of controlling transmission of light.

As such an optical body, for example, an optical body having a micro concave-convex structure (a so-called moth-eye structure) formed on a surface of which an average period of concavities and convexities is equal to or shorter than a wavelength belonging to a visible light band can be exemplified. Since a refractive index of the surface on which the micro concave-convex structure is formed gently changes with respect to incident light, an abrupt change in the refractive index, which is the cause of reflection, does not occur. Thus, an optical body having the micro concave-convex structure formed on a light incidence surface can reduce reflection of incident light over a wide wavelength band.

For example, Patent Literature 1 described below discloses an anti-reflective laminate having the micro concave-convex structure formed on a surface using an anodic oxidation method. In addition, Patent Literature 2 described below discloses a technology of producing an optical element by forming an inverted shape of the micro concave-convex structure on a master using lithography and etching and transferring the inverted shape formed on the master to a resin material.

In addition, Patent Literature 3 described below discloses an optical member having a concave-convex structure formed on a surface by directly performing dry etching on a base material without using a mask in order to alleviate wavelength dependence of a reflectance.

CITATION LIST

Patent Literature

Patent Literature 1: JP 2009-230045A
Patent Literature 2: JP 2009-258751A
Patent Literature 3: JP 2013-109228A

SUMMARY OF INVENTION

Technical Problem

However, such optical bodies produced in the technologies disclosed in Patent Literature 1 and Patent Literature 2 have a problem that a reflectance thereof fluctuates depending on a wavelength of incident light. The reason for this is that, since the micro concave-convex structure with concavities and convexities having substantially uniform heights is formed in the technologies disclosed in Patent Literature 1 and Patent Literature 2, the micro concave-convex structure is not capable of dealing with incident light beams having various wavelengths.

In addition, there is a problem with the optical member disclosed in Patent Literature 3 that, since a reflectance of the optical member is set to be high, it is not possible to obtain a satisfactory reflection suppression effect.

Thus, the present invention takes the above-described problems into account and aims to provide a novel and improved optical body and display device that enable wavelength dependence of a reflectance to be reduced and reflection of incident light to be further suppressed.

Solution to Problem

According to an aspect of the present invention in order to achieve the above object, there is provided an optical body including: a concave-convex structure formed on a surface of a base material. An average period of concavities and convexities of the concave-convex structure is equal to or shorter than a wavelength belonging to a visible light band. A standard deviation of differences between respective positions of bottom faces of the concavities of the concave-convex structure in a normal direction of a flat surface of the base material and a median of the positions of the bottom faces is greater than or equal to 25 nm.

A standard deviation of differences between respective positions of vertexes of the convexities of the concave-convex structure in the normal direction of the flat surface of the base material and a median of the positions of the vertexes may be greater than or equal to 35 nm.

A Y value that is a luminous reflectance of the optical body may be equal to or lower than 0.2%, and the absolute values of reflection hues a* and b* of the optical body may be equal to or smaller than 1.

An average reflectance of the optical body in a wavelength band from 380 nm to 780 nm may be equal to or lower than 0.2%.

A macro concave-convex structure formed on the surface of the base material to be superimposed on the concave-convex structure may be further included. An average period of concavities and convexities of the macro concave-convex structure may be longer than a wavelength belonging to the visible light band.

A planar array of the convexities or concavities of the concave-convex structure may be a hexagonal grid shape or a square grid shape.

A planar array of the convexities or concavities of the concave-convex structure may be a random array.

According to another aspect of the present invention in order to achieve the above object, there is provided a display device including: the above optical body.

According to the present invention, since it is possible to increase unevenness in positions of bottom faces of concavities of a micro concave-convex structure in a normal direction of a flat surface of a base material, the micro concave-convex structure can suppress reflection of incident light beams having various wavelengths.

Advantageous Effects of Invention

According to the present invention described above, the wavelength dependence of a reflectance of an optical body can be reduced and reflection of incident light can be further suppressed.

DESCRIPTION OF EMBODIMENTS

Figure 1:
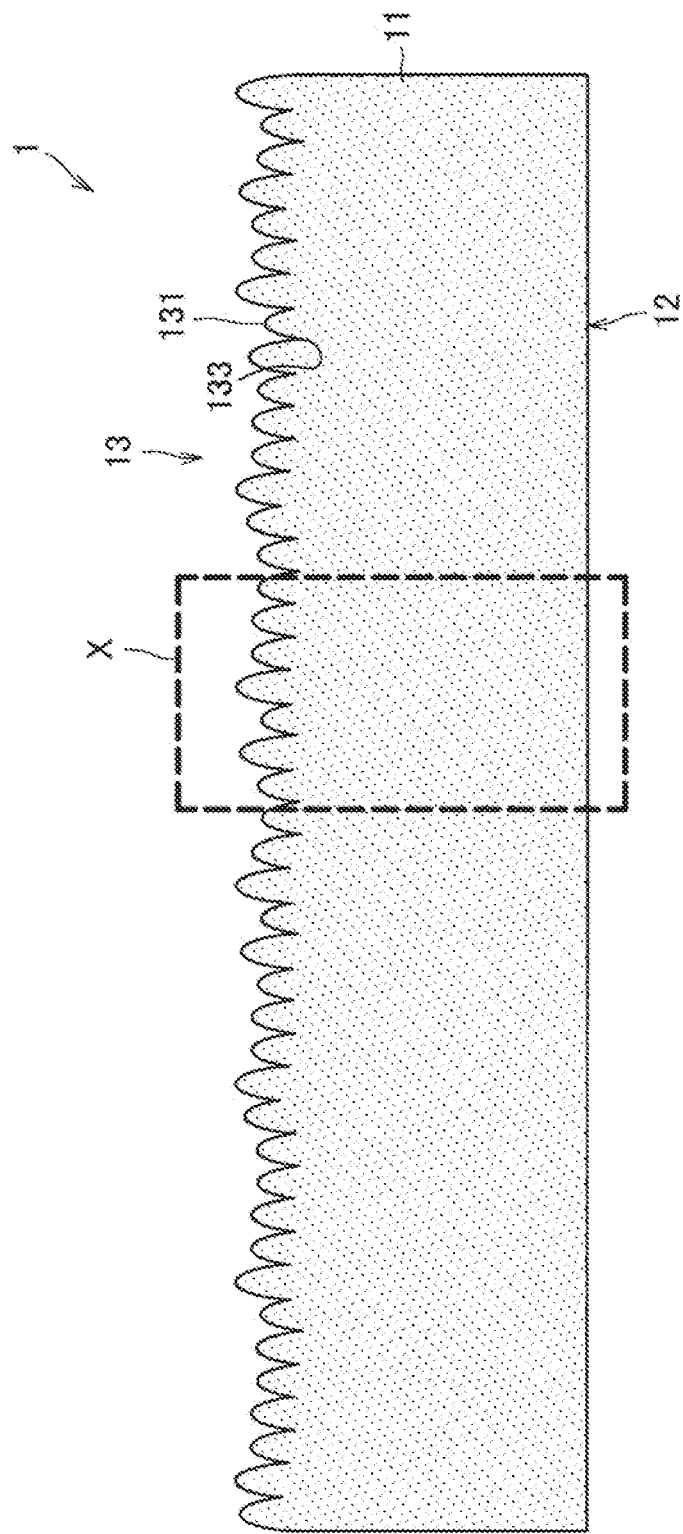
FIG. 1 is a cross-sectional diagram schematically illustrating a cross-sectional shape obtained by cutting an optical body according to an embodiment of the present invention in a thickness direction.

Hereinafter, (a) preferred embodiment(s) of the present invention will be described in detail with reference to the appended drawings. Note that, in this specification and the appended drawings, structural elements that have substantially the same function and structure are denoted with the same reference numerals, and repeated explanation of these structural elements is omitted.

<1. Structure of Optical Body>

First, a structure of an optical body according to an embodiment of the present invention will be described with reference to FIG. 1 and FIG. 2. FIG. 1 is a cross-sectional diagram schematically illustrating a cross-sectional shape obtained by cutting an optical body 1 according to the present embodiment in a thickness direction.

The optical body 1 has a micro concave-convex structure 13 formed on a surface of a base material 11 as illustrated in FIG. 1.

The base material 11 is a transparent material. The base material 11 may be, for example, a transparent resin substrate of polycarbonate, polyethylene terephthalate, polymethyl methacrylate, or the like, a transparent resin film of cellulose triacetate (TAC), a cyclic olefin copolymer (COC), or the like, or a transparent glass substrate of quartz glass, soda-lime glass, lead glass, or the like. However, the base material 11 is not limited to the above-described materials, and may be another known transparent material.

Note that the above-mentioned "transparent" means a high transmittance of light having a wavelength belonging to a visible light band (approximately from 360 nm to 830 nm). Being "transparent" may mean, for example, having a transmittance of 70% or higher for light having a wavelength belonging to the visible light band.

The micro concave-convex structure 13 is a concave-convex structure formed on the base material 11. The micro concave-convex structure 13 has convexities 131 that are convex with respect to a flat surface 12 of the base material 11 and concavities 133 that are concave with respect to the flat surface 12 of the base material 11.

An average period of the concavities and convexities of the micro concave-convex structure 13 is equal to or shorter than a wavelength belonging to the visible light band (e.g., equal to or shorter than 830 nm), and is preferably larger than or equal to 100 nm and equal to or shorter than 350 nm. Here, the average period of the concavities and convexities of the micro concave-convex structure 13 means an average distance between the vertexes of adjacent convexities 131 or an average distance between the centers of bottom faces of adjacent concavities 133. Since a refractive index of the surface of the base material 11 on which the micro concave-convex structure 13 is formed gently changes with respect to incident light, an abrupt change in a refractive index, which is the cause of reflection, does not occur. For this reason, the micro concave-convex structure 13 can lower a reflectance of the base material 11 with respect to incident light in a wide wavelength band including visible light.

The planar array of the micro concave-convex structure 13 may be, for example, a two-dimensional array in which the convexities 131 or the concavities 133 are periodically arrayed on a plane parallel to the flat surface of the base material 11, or may be a random two-dimensional array with no periodicity. In the case in which the convexities 131 or the concavities 133 of the micro concave-convex structure 13 are periodically arrayed, the two-dimensional array pattern of the convexities 131 or the concavities 133 may be a hexagonal grid pattern or a square grid pattern.

In addition, in the case in which the two-dimensional array pattern of the convexities 131 or the concavities 133 is a hexagonal grid or square grid pattern, a distance (which is also called a pitch) between the respective convexities 131 or concavities 133 may be, for example, longer than or equal to 100 nm and equal to or shorter than 350 nm, or preferably longer than or equal to 150 nm and equal to or shorter than 280 nm. A case in which the distance between the respective convexities 131 or concavities 133 is shorter than 100 nm is not desirable because forming the micro concave-convex structure 13 can be difficult. In addition, a case in which the distance between the respective convexities 131 or concavities 133 exceeds 350 nm is not desirable because there is a possibility of diffraction of visible light. Note that the distance between the respective convexities 131 or concavities 133 may vary depending on an arrangement direction or may be uniform.

Here, although not illustrated, in a case in which positions of bottom faces of the concavities 133 of the micro concave-convex structure 13 in the normal direction of the flat surface 12 of the base material 11 are substantially uniform as disclosed in the related art, the reflectance of the base material 11 with respect to incident light has wavelength dependence in accordance with depths of the concavities 133. Since such an optical body deals with a significantly high ratio of reflected light having a wavelength that causes a relatively high reflectance, the reflected light has a color (i.e., the reflected light contains a hue). In addition, a Y value that is a luminous reflectance increases in a wavelength band that causes a relatively high reflectance.

On the other hand, in the optical body 1 according to the present embodiment, the positions of the bottom faces of the concavities 133 of the micro concave-convex structure 13 in the normal direction of the flat surface 12 of the base material 11 are uneven over a certain degree as illustrated in FIG. 1. Accordingly, the optical body 1 according to the present embodiment can suppress reflection of light beams having various wavelengths, and thus can reduce wavelength dependence of reflectance. Therefore, the optical body 1 according to the present embodiment can suppress reflection of incident light without causing reflected light to have a color.

Next, a structure of the micro concave-convex structure 13 will be described in more detail with reference to FIG. 2. FIG. 2 is an enlarged cross-sectional diagram schematically illustrating an enlarged partial region X of FIG. 1.

Figure 2:
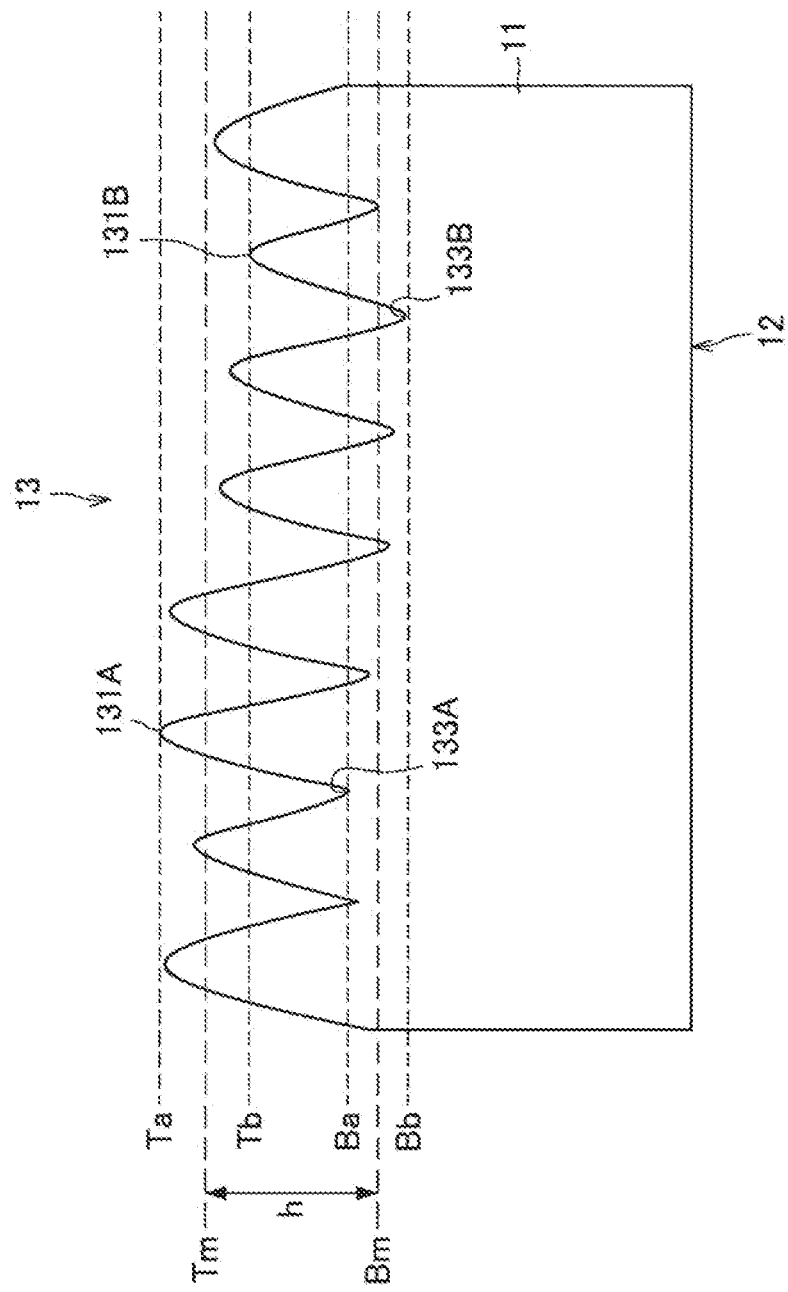
FIG. 2 is an enlarged cross-sectional diagram schematically illustrating an enlarged partial region X of FIG. 1.

The positions of the bottom faces of the concavities 133 in the normal direction of the flat surface 12 of the base material 11 are uneven in the micro concave-convex structure 13 of the optical body 1 according to the present embodiment as illustrated in FIG. 2. Specifically, the standard deviation of the differences between the respective positions of the bottom faces of the concavities 133 in the normal direction of the flat surface 12 of the base material 11 and the median of the positions of the bottom faces of the concavities 133 is greater than or equal to 25 nm. In the case in which a value of the unevenness in the positions of the bottom faces of the concavities 133 of the micro concave-convex structure 13 is greater than or equal to the above-mentioned value, the wavelength dependence of the reflectance of the optical body 1 can be dramatically reduced.

Note that an upper limit value of the standard deviation of the differences between the positions of the bottom faces of the concavities 133 and the median of the positions of the bottom faces is not particularly limited. However, in a case in which the standard deviation is very large exceeding 25 nm, there is a risk of the effect of reducing the wavelength dependence being saturated and other optical characteristics being affected. Thus, the upper limit value of the standard deviation of the differences between the positions of the bottom faces of the concavities 133 and the median of the positions of the bottom faces can be set to 200 nm.

Here, a method of calculating the above-described standard deviation of the differences between the respective positions of the bottom faces of the concavities 133 and the median of the positions of the bottom faces of the concavities 133 will be described in more detail with reference to FIG. 2.

First, a surface shape of a predetermined region (e.g., 2 square μm, or the like) of the optical body 1 is measured using an atomic force microscope (AFM), or the like. Next, after a cross-sectional shape of the micro concave-convex structure 13 is calculated using the measured surface shape, the respective positions of the bottom faces of the concavities 133 in the normal direction of the flat surface 12 of the base material 11 are measured. At this time, each of the positions of the bottom faces of the concavities 133 may be measured by setting, for example, the position of the bottom face of a concavity 133B that is closest to the flat surface 12 side of the base material 11 as a zero point (a reference point).

Next, the median (also called a median value) of the positions of the bottom faces of the concavities 133 in the normal direction of the flat surface 12 of the base material 11 is calculated. Accordingly, the standard deviation of the differences between the respective positions of the bottom faces of the concavities 133 in the normal direction of the flat surface 12 of the base material 11 and the median of the positions of the bottom faces can be calculated. Note that, in FIG. 2, the median of the positions of the bottom faces of the concavities 133 is denoted by Bm. In addition, the position of the bottom face of a concavity 133A that is farthest from the flat surface 12 side of the base material 11 is denoted by Ba, and the position of the bottom face of the concavity 133B that is closest to the flat surface 12 side of the base material 11 is denoted by Bb.

In addition, in the micro concave-convex structure 13 of the optical body 1 according to the present embodiment, it is desirable for the positions of the vertexes of the convexities 131 in the normal direction of the flat surface 12 of the base material 11 to be uneven as illustrated in FIG. 2. Specifically, it is desirable for the standard deviation of the differences between the respective positions of the vertexes of the convexities 131 in the normal direction of the flat surface 12 of the base material 11 and the median of the positions of the vertexes of the convexities 131 to be greater than or equal to 35 nm. In the case in which a value of unevenness of the positions of the vertexes of the convexities 131 of the micro concave-convex structure 13 is greater than or equal to the above-mentioned value, the wavelength dependence of the reflectance of the optical body 1 can be further reduced.

Note that an upper limit of the standard deviation of the differences between the positions of the vertexes of the convexities 131 and the median of the positions of the vertexes is not particularly limited. However, in a case in which the standard deviation is very large exceeding 35 nm, there is a risk of the effect of reducing the wavelength dependence being saturated and other optical characteristics being affected. Thus, the upper limit value of the standard deviation of the differences between the positions of the vertexes of the convexities 131 and the median of the positions of the vertexes may be set to 200 nm.

The standard deviation of the differences between the respective positions of the vertexes of the convexities 131 and the median of the positions of the vertexes of the convexities 131 can also be calculated similarly to that with respect to the positions of the bottom faces of the concavities 133.

First, the surface shape of a predetermined region (e.g., 2 square μm) of the optical body 1 is similarly measured using an AFM or the like, and after a cross-sectional shape of the micro concave-convex structure 13 is calculated, the respective positions of the vertexes of the convexities 131 in the normal direction of the flat surface 12 of the base material 11 are measured. At this time, the respective positions of the vertexes of the convexities 131 may be measured by setting, for example, the position of the bottom face of the concavity 133B that is closest to the flat surface 12 side of the base material 11 as a zero point (a reference point).

Next, the median (also called a median value) of the positions of the vertexes of the convexities 131 in the normal direction of the flat surface 12 of the base material 11 is calculated. Accordingly, the standard deviation of the differences between the respective positions of the vertexes of the convexities 131 in the normal direction of the flat surface 12 of the base material 11 and the median of the positions of the vertexes can be calculated. Note that, in FIG. 2, the median of the positions of the vertexes of the convexities 131 is denoted by Tm. In addition, the position of the vertex of a convexity 131A that is farthest from the flat surface 12 side of the base material 11 is denoted by Ta, and the position of the vertex of the convexity 131B that is closest to the flat surface 12 side of the base material 11 is denoted by Tb.

Here, the difference between the median Tm of the positions of the vertexes of the convexities 131 and the median Bm of the positions of the bottom faces of the concavities 133 is an average height h of the convexities 131 of the micro concave-convex structure 13. The average height h of the convexities 131 of the optical body 1 according to the present embodiment may be, for example, higher than or equal to 100 nm and equal to or lower than 400 nm, or preferably higher than or equal to 200 nm and equal to or lower than 300 nm.

The optical body 1 having the above-described structure can reduce the wavelength dependence of the reflectance. Specifically, the optical body 1 according to the present embodiment can have the absolute values of reflection hues (a*, b*) equal to or smaller than 1. Reflection hues (a*, b*) are (L*, a*, b*) when the color of reflected light is expressed in a L* a* b* color system and represent that the color of reflected light is closer to white as the values of the reflection hues (a*, b*) of the reflected light get closer to 0. Thus, since the optical body 1 according to the present embodiment can reduce the wavelength dependence of the reflectance, it can cause reflected light not to have a color.

In addition, the optical body 1 having the above-described structure can suppress reflection of incident light more. Specifically, the optical body 1 according to the present embodiment can have a Y value that is a luminous reflectance equal to or lower than 0.2%. The Y value (luminous reflectance) is (Y, x, y) when the color of reflected light is expressed in a Yxy color system and represents that reflection is suppressed further as the Y value (luminous reflectance) becomes smaller. Thus, the optical body 1 according to the present embodiment can further suppress reflection of incident light.

In addition, the optical body 1 having the above-described structure particularly can suppress reflection of light having a wavelength belonging to the visible light band. Specifically, the optical body 1 according to the present embodiment can have an average reflectance equal to or lower than 0.2% in the wavelength band from 380 nm to 780 nm. Accordingly, in a case in which the optical body 1 according to the present embodiment is used for a display surface of a display device or the like, the optical body can suppress reflection of light having a wavelength belonging to the visible light band visible to humans. Thus, the optical body 1 according to the present embodiment can remarkably improve visibility of a display device or the like.

<2. Modified Example>

Figure 3:
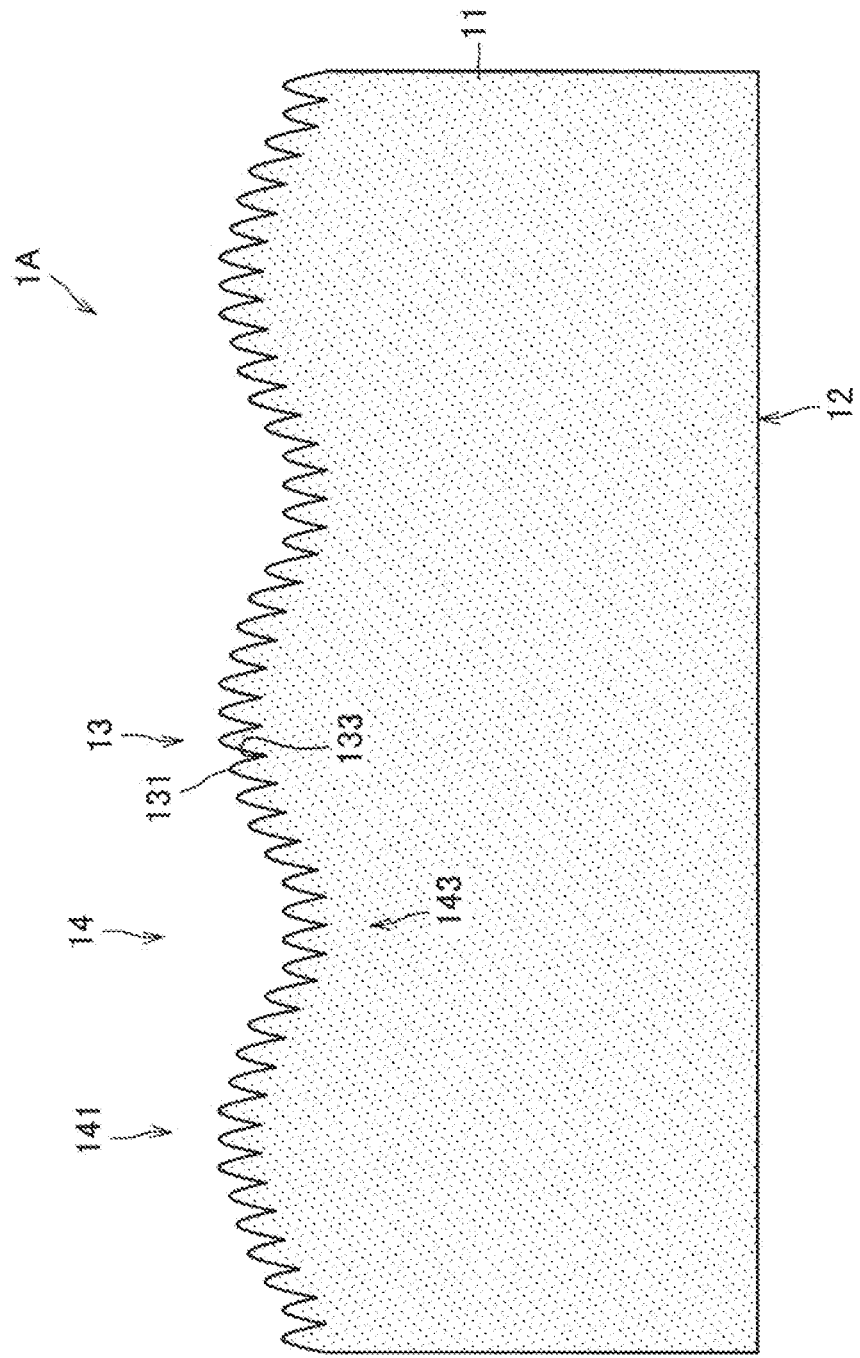
FIG. 3 is a cross-sectional diagram schematically illustrating a cross-sectional shape obtained by cutting an optical body according to a modified example in a thickness direction.

Next, a modified example of the optical body according to the present embodiment will be described with reference to FIG. 3. FIG. 3 is a cross-sectional diagram schematically illustrating a cross-sectional shape obtained by cutting an optical body 1A according to the present modified example in a thickness direction.

The optical body 1A has a macro concave-convex structure 14 formed in a superimposing manner with the micro concave-convex structure 13 in addition to the micro concave-convex structure 13 formed on a surface of the base material 11 as illustrated in FIG. 3.

Since a material of the base material 11 of the optical body 1A according to the present modified example is substantially similar to that of the optical body 1 illustrated in FIG. 1, description thereof will be omitted here.

In addition, an average period of concavities and convexities of the micro concave-convex structure 13 of the optical body 1A is equal to or shorter than a wavelength belonging to the visible light band (e.g., equal to or shorter than 830 nm) as well. Furthermore, the standard deviation of the differences between respective positions of bottom faces of the concavities 133 of the micro concave-convex structure 13 in the normal direction of a flat surface 12 of a base material 11 and the median of the positions of the bottom faces of the concavities 133 is greater than or equal to 25 nm.

The macro concave-convex structure 14 have peaks 141 that are convexities with respect to the flat surface 12 of the base material 11 and valleys 143 that are concavities with respect to the flat surface 12 of the base material 11. An average period of the concavities and convexities of the macro concave-convex structure 14 is larger than a wavelength belonging to the visible light band (e.g., exceeding 830 nm), or preferably greater than or equal to 1 µm and equal to or shorter than 100 µm. Here, the average period of the concavities and convexities of the macro concave-convex structure 14 is an average distance between adjacent peaks 141 or valleys 143.

The above-described macro concave-convex structure 14 may have a rough surface structure in which, for example, the average period of the concavities and convexities is greater than or equal to 1 µm and equal to or shorter than 100 µm. Because the macro concave-convex structure 14 can scatter light incident on the surface of the base material 11, an antiglare effect can be imparted to the optical body 1A. Thus, because the optical body 1A according to the present modified example has a reflection suppression effect attributable to the micro concave-convex structure 13 and an antiglare effect attributable to the macro concave-convex structure 14, the optical body can remarkably improve visibility of a display surface when the optical body is used for a display surface of a display device or the like.

<3. Production Method of Optical Body>

Figure 4:
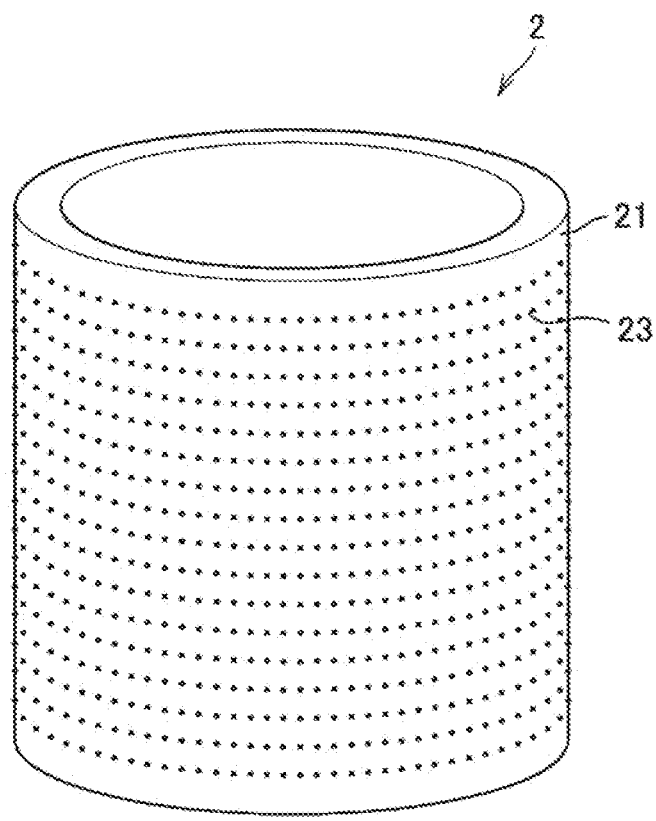
FIG. 4 is a perspective diagram schematically illustrating a master used in producing an optical body according to an embodiment of the present invention.

Next, a production method of the optical body 1 according to the present embodiment will be described with reference to FIG. 4 to FIG. 8. FIG. 4 is a perspective diagram schematically illustrating a master 2 used in producing the optical body 1 according to the present embodiment.

The optical body 1 according to the present embodiment can be produced using, for example, a roll-to-roll nano-imprinting method using the master 2 illustrated in FIG. 4.

The roll-to-roll nano-imprinting method specifically is a method of transferring a concave-convex structure formed on an outer circumferential surface of the master to a resin base material or the like by pressing the master with the concave-convex structure formed on the outer circumferential surface on the base material or the like while rotating the master. The optical body 1 according to the present embodiment can be efficiently produced by, for example, pressing the master with the micro concave-convex structure 13 formed on the outer circumferential face to the base material 11 while rotating the master.

The master 2 for producing the optical body 1 according to the present embodiment is formed of, for example, a cylindrical or columnar master base material 21 having an outer circumferential surface with a concave-convex structure 23 formed thereon as illustrated in FIG. 4.

The master base material 21 is, for example, a cylindrical or columnar member. A shape of the master base material 21 may be a hollow cylinder shape having a hollow therein as illustrated in FIG. 4 or a solid columnar shape with no cavity therein. A material of the master base material 21 is not particularly limited, and quartz glass ($SiO_2$) such as fused quartz glass, synthetic quartz glass, or the like, a metal such as stainless steel or the like, a material of which an outer circumferential surface of a metal such as stainless steel or the like is coated with $SiO_2$, or the like can be used.

Although a size of the master base material 21 is not particularly limited, a length thereof in an axial direction may be, for example, longer than or equal to 100 mm, and an outer diameter thereof may be larger than or equal to 50 mm and equal to or smaller than 300 mm. In addition, in the case in which the master base material 21 has a cylindrical shape, a thickness of the cylinder may be larger than or equal to 2 mm and equal to or smaller than 50 mm.

The concave-convex structure 23 is a structure in which the structure is formed on the outer circumferential surface of the master base material 21 and the micro concave-convex structure 13 formed on the surface of the optical body 1 is inverted. Since the concave-convex structure 23 has the structure in which the micro concave-convex structure 13 is inverted, an average period of concavities and convexities of the concave-convex structure 23 is equal to or shorter than a wavelength belonging to the visible light band (e.g., equal to or shorter than 830 nm), similarly to that of the micro concave-convex structure 13. In addition, positions of bottom faces of concavities and positions of vertexes of convexities of the concave-convex structure 23 have predetermined unevenness in the normal direction of the outer circumferential surface of the master base material 21 as described above.

Note that a planar array of the concave-convex structure 23 may be, for example, a two-dimensional array in which the convexities and concavities are periodically arrayed or a random two-dimensional array in which the convexities and concavities have no periodicity. The convexities or concavities of the concave-convex structure 23 may be arrayed in, for example, a hexagonal grid shape or a square grid shape.

Figure 5:
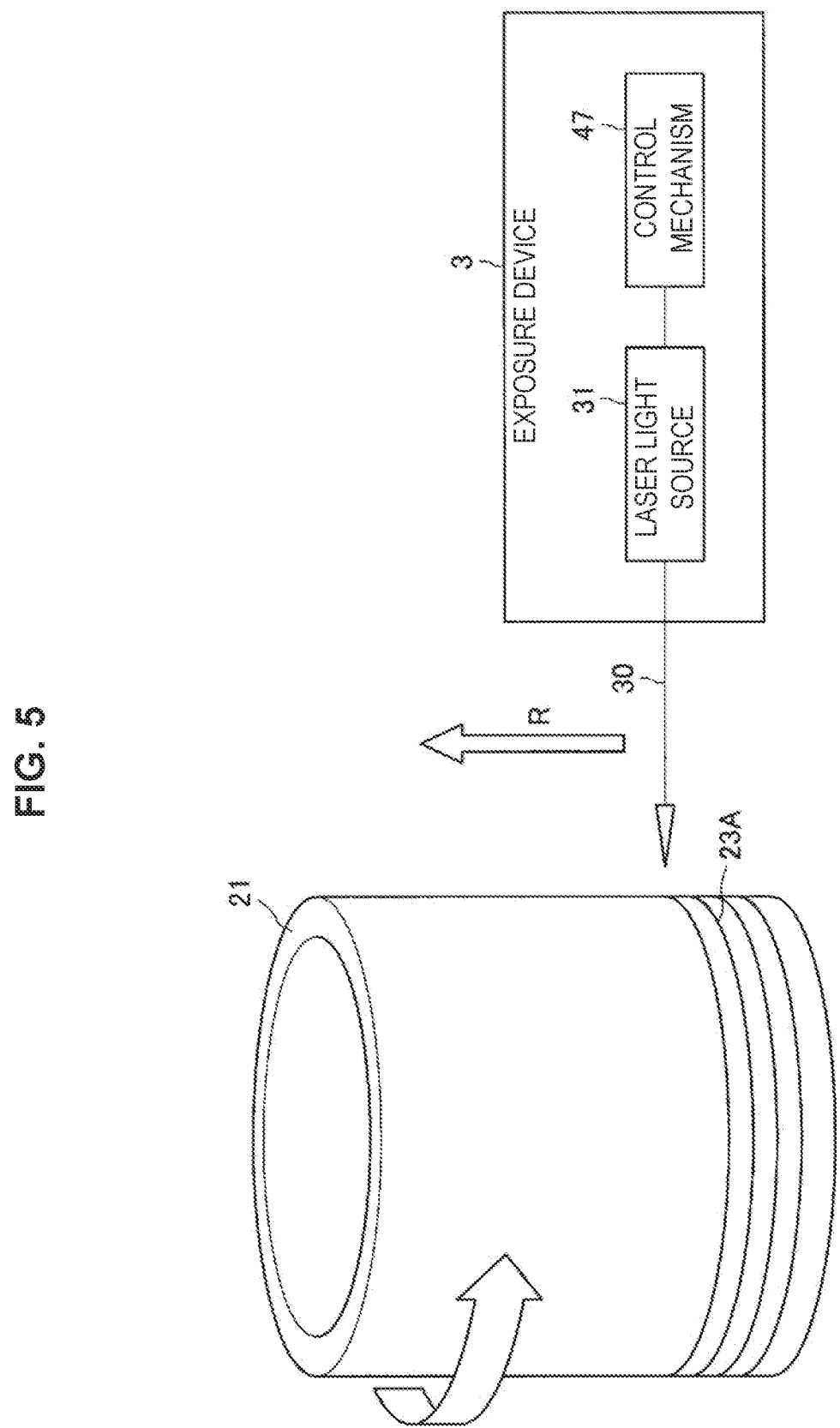
FIG. 5 is a schematic diagram for describing a production method of a master.

Next, a production method of the master 2 will be described with reference to FIGS. 5 to 7. FIG. 5 is a schematic diagram for describing the production method of the master 2.

The master 2 can be produced by sequentially executing, for example, a film formation process of forming a resist layer formed of an inorganic material on the outer circumferential surface of the master base material 21, an exposure process of forming a latent image on the resist layer by irradiating the resist layer with laser light, a development process of developing the resist layer with the latent image formed thereon, and an etching process of forming the concave-convex structure 23 on the outer circumferential surface of the master base material 21 by performing etching using the resist layer having a pattern formed through the development as a mask.

First, in the film formation process, a resist layer formed of an inorganic material is formed on the outer circumferential surface of the master base material 21. As the inorganic material for forming the resist layer, for example, a metal oxide containing one or two or more kinds of transition metals such as tungsten, molybdenum, or the like can be used. The resist layer can be formed using, for example, a sputtering method.

Next, latent images 23A corresponding to the concave-convex structure 23 are formed on the resist layer in the exposure process by irradiating the resist layer formed on the outer circumferential surface of the master base material 21 with layer light 30 emitted from an exposure device 3 as illustrated in FIG. 5.

Next, in the development process, a resist pattern corresponding to the latent image 23A is formed on the resist layer by developing the resist layer having the latent images 23A formed thereon. In a case in which the resist layer is formed of an inorganic material, for example, the resist layer is developed using an alkaline solution such as a tetramethylammonium hydroxide (TMAH) aqueous solution.

Next, in the etching process, the concave-convex structure 23 corresponding to the latent images 23A is formed on the outer circumferential surface of the master base material 21 by etching the master base material 21 using the resist layer having the resist pattern formed thereon as a mask. For the etching of the master base material 21, any of dry etching or wet etching can be used. In a case in which a material of the master base material 21 is quartz glass ($SiO_2$), for example, the master base material 21 can be etched in dry etching using fluorocarbon gas or in wet etching using hydrofluoric acid or the like.

In the production method of the master 2 according to the present embodiment, the above-described concave-convex structure 23 can be formed on the outer circumferential surface of the master base material 21 by appropriately controlling irradiation of the laser light 30 from the exposure device 3 in the exposure process. The exposure device 3 used in the production method of the master 2 according to the present embodiment will be described below with reference to FIG. 5.

The exposure device 3 includes a laser light source 31 that emits the laser light 30 and a control mechanism 47 that controls oscillation of the laser light 30 from the laser light source 31 as illustrated in FIG. 5.

The laser light source 31 is a light source that emits the laser light 30. The laser light source 31 may be of, for example, a semiconductor laser or the like. Although a wavelength of the laser light 30 emitted by the laser light source 31 is not particularly limited, it may be, for example, a wavelength in the range from 400 nm to 500 nm in a blue light band.

The control mechanism 47 generates a control signal for controlling oscillation made by the laser light source 31. By generating a pulse signal having randomness, the control mechanism 47 can impart randomness (i.e., unevenness) to a disposition and height of the concave-convex structure 23 in a wavelength region of visible light or further. Here, the pulse signal having randomness may be specifically a randomly phase-modulated pulse signal or a random signal (including a pseudo-random signal).

The exposure device 3 performs irradiation of the laser light 30 on, for example, the master base material 21 rotating with respect to an axis while moving the irradiation position of the laser light 30 in the axial direction of the master base material 21 (the direction of the arrow R). Accordingly, the master base material 21 is exposed to light by the exposure device 3 in a spiral shape and thereby the latent images 23A are formed.

Here, pulse signals having randomness generated by the control mechanism 47 will be described in detail with reference to FIG. 6. FIG. 6 is a schematic diagram for describing pulse signals generated by the control mechanism 47.

Figure 6:
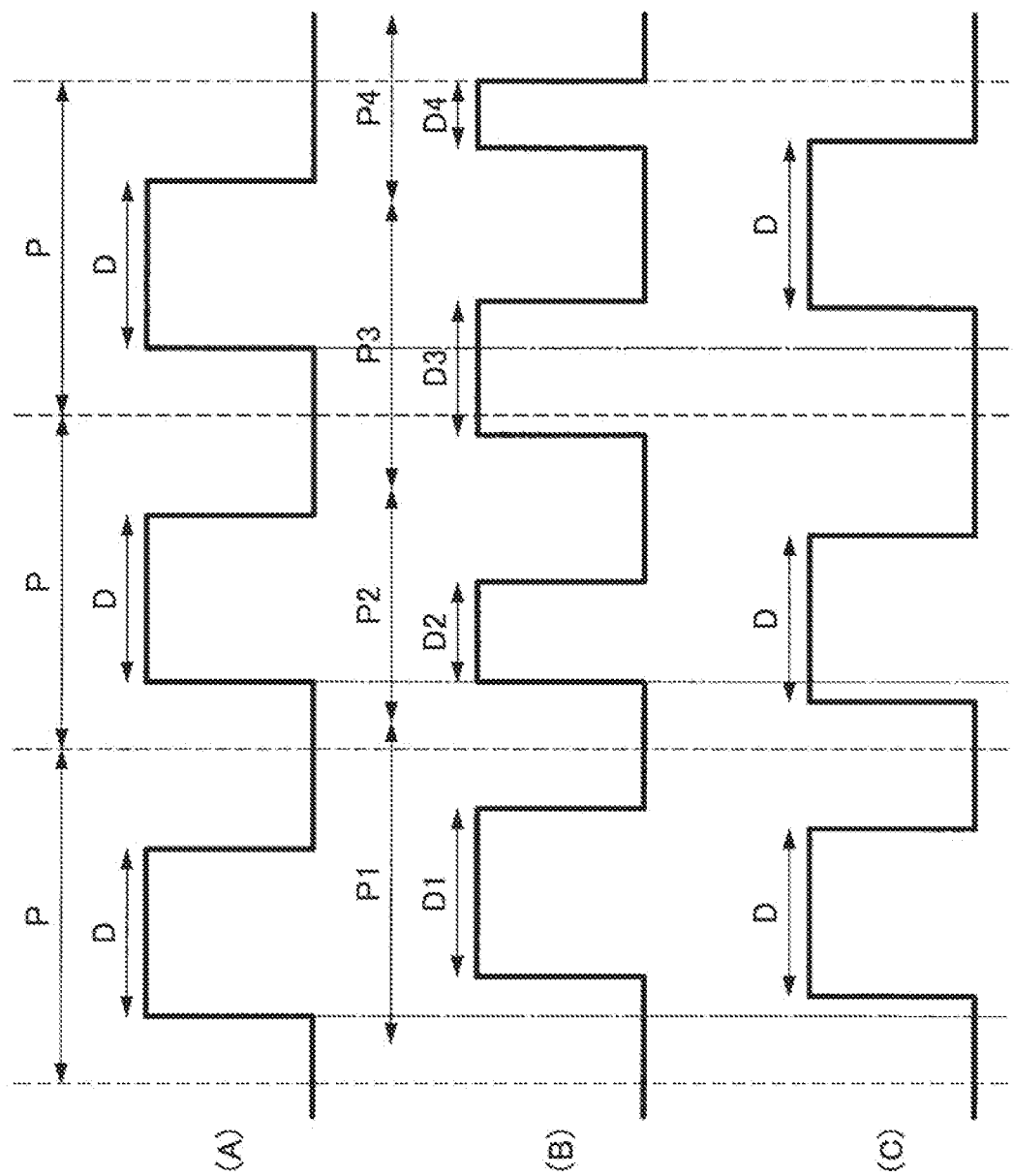
FIG. 6 is a schematic diagram for describing pulse signals generated by a control mechanism.

The pulse signal illustrated in (A) of FIG. 6 is a periodic rectangular wave having a period of P and a pulse width of D. In a case in which the control mechanism 47 generates the pulse signal illustrated in (A) of FIG. 6, for example, lengths of an irradiation time and a non-irradiation time of the laser light 30 are uniform. Thus, since sizes of regions of the resist layer thermally reacting due to the exposure become periodic as well, the periodic latent images 23A are formed on the resist layer. Hence, open regions formed due to the dissolved resist and regions in which the resist remains having uniform sizes are periodically arranged on the developed resist layer, and thus the master base material 21 has concavities having uniform depths and convexities having uniform heights formed thereon through etching.

Meanwhile, the control mechanism 47 generates a pulse signal having randomness as illustrated in (B) or (C) of FIG. 6 in the present embodiment.

The pulse signal illustrated in (B) of FIG. 6 is a rectangular wave having random periods of P1, P2, P3, P4, . . . and random pulse widths of D1, D2, D3, D4, . . . . In a case in which the control mechanism 47 generates the pulse signal illustrated in (B) of FIG. 6, for example, lengths of an irradiation time and a non-irradiation time of the laser light 30 become random. Thus, since sizes of regions of the resist layer thermally reacting due to the exposure randomly vary depending on irradiation quantities of the laser light 30, the latent images 23A having the random sizes are formed on the resist layer. Hence, opened regions formed due to the dissolved resist and regions in which the resist remains having the random sizes are arranged on the developed resist layer, and thus the master base material 21 has concavities having uneven depths and convexities having uneven heights formed thereon through etching.

The optical body 1 produced using the master 2 having the concave-convex structure 23 formed thereon using such a random pulse signal has the standard deviation of the differences between the respective positions of the bottom faces of concavities 133 in the normal direction of the flat surface 12 of the base material 11 of the optical body 1 and the median of the positions of the bottom faces of the concavities 133 greater than or equal to 25 nm as described above. In addition, the optical body 1 can have the standard deviation of the differences between the respective positions of the vertexes of the convexities 131 in the normal direction of the flat surface 12 of the base material 11 and the median of the positions of the vertexes of the convexities 131 greater than or equal to 35 nm.

In addition, the pulse signal illustrated in (C) of FIG. 6 is a pulse signal obtained by performing random phase modulation on a rectangular wave having a period of P and a pulse width of D. Phase modulation is to vary timings of risings of a waveform in periods, and a phase-modulated pulse signal has varied timings of risings and falls of a waveform with respect to the pulse signal illustrated in (A) of FIG. 6, as illustrated in (C) of FIG. 6.

In a case in which the control mechanism 47 generates the pulse signal illustrated in (C) of FIG. 6, for example, lengths of non-irradiation times randomly vary in accordance with a phase modulation amount while length of irradiation times of the laser light 30 are uniform. Thus, since the sizes of the regions not thermally reacting due to exposure randomly vary depending on positions of the latent images 23A, the sizes of the regions not thermally reacting due to exposure randomly vary depending on a phase modulation amount of the pulse signal used in exposure of the adjacent latent images 23A. Thus, in the developed resist layer, the sizes of the regions in which the resist remains randomly vary depending on the phase modulation amount of the pulse signal used in exposure of adjacent resist patterns, and thereby the convexities having uneven heights are formed on the master base material 21 through etching.

Note that, in the case in which the control mechanism 47 generates the pulse signal illustrated in (C) of FIG. 6, the lengths of the irradiation times of the laser light 30 are uniform, and thus a planar array of the concave-convex structure 23 formed on the master base material 21 is a substantially periodic array, rather than a random array.

In addition, in the case in which the control mechanism 47 generates the randomly phase-modulated pulse signal illustrated in (C) of FIG. 6, the exposure device 3 can control the uneven degree of the positions of the bottom faces of the concavities and the positions of the vertexes of the convexities of the concave-convex structure 23 in the normal direction of the outer circumferential surface of the master base material 21 by varying the phase modulation amount of the pulse signal.

That is, in the present embodiment, it is possible to control unevenness in the position of the bottom faces of the concavities and unevenness in the positions of the vertexes of the convexities in the normal direction of the flat surface of the base material of the optical body 1 produced using the master 2 by controlling a phase modulation amount of a pulse signal that controls oscillation made by the laser light source 31 that is used in the production of the master 2.

In the case of the optical body 1 in which the standard deviation of the differences between the respective positions of the bottom faces of the concavities 133 in the normal direction of the flat surface of the base material of the optical body 1 and the median of the positions of the bottom faces of the concavities 133 is greater than or equal to 25 nm as described above, for example, a phase modulation amount of a pulse signal may be greater than or equal to 10% of the period of the pulse signal. In addition, in the case of in the optical body 1 in which the standard deviation of the differences between the respective positions of the vertexes of the convexities 131 in the normal direction of the flat surface of the base material of the optical body 1 and the median of the positions of the vertexes of the convexities 131 is greater than or equal to 35 nm as described above, a phase modulation amount of a pulse signal may be greater than or equal to 10% of a period of the pulse signal.

As described above, randomness of a certain degree is imparted to a pulse signal controlling irradiation of the laser light 30 in the exposure process of forming patterns on the outer circumferential surface of the master 2 for producing the optical body 1 according to the present embodiment. Accordingly, the positions of the bottom faces of the concavities and the positions of the vertexes of the convexities of the concave-convex structure 23 of the master 2 can have unevenness of a certain degree. Therefore, the above-described master 2 can produce the optical body 1 according to the present embodiment by transferring the concave-convex structure 23 formed on the outer circumferential surface to a resin or the like.

Here, the exposure of the columnar or cylindrical master base material 21 to light can be executed by, for example, the exposure device 3 that will be described in detail with reference to FIG. 7. FIG. 7 is an explanatory diagram for describing a specific configuration of the exposure device 3 used in the exposure of the master base material 21 to light.

Figure 7:
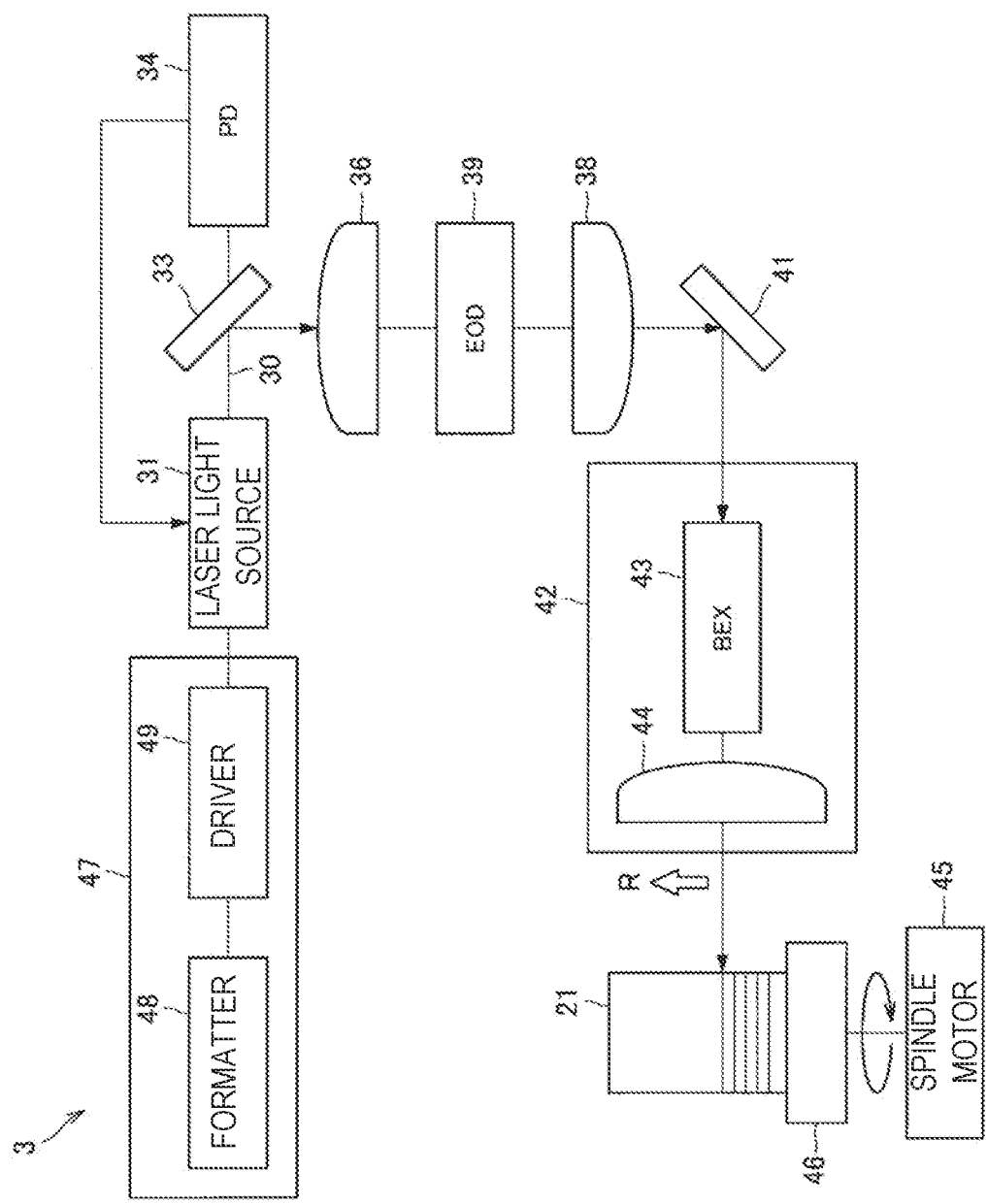
FIG. 7 is an explanatory diagram for describing a specific configuration of an exposure device used in exposure of a master base material to light.

The exposure device 3 includes the laser light source 31, a first mirror 33, a photodiode (PD) 34, a condenser lens 36, an electro-optic deflector (EOD) 39, a collimator lens 38, a second mirror 41, a beam expander (BEX) 43, and an objective lens 44 as illustrated in FIG. 7. In addition, the laser light source 31 is controlled by the control mechanism 47, and the laser light 30 oscillating from the laser light source 31 is irradiated to the master base material 21 placed on a turntable 46 rotated by a spindle motor 45.

The laser light source 31 is a light source that causes the laser light 30 exposed to the resist layer formed on the outer circumferential surface of the master base material 21 to oscillate as described above. The laser light source 31 may be a semiconductor laser that emits laser light having a wavelength in the range from 400 nm to 500 nm, for example, the blue light band. The laser light 30 released from the laser light source 31 travels straight ahead as a parallel beam and then is reflected on the first mirror 33.

In addition, the laser light 30 reflected on the first mirror 33 is condensed at the electro-optic deflector 39 by the condenser lens 36, and then turns into a parallel beam again by the collimator lens 38. The laser light 30 that has turned into a parallel beam is reflected on the second mirror 41 and then horizontally led onto a moving optical table 42.

The first mirror 33 is configured as a polarization beam splitter and has a function of reflecting some of polarized light components thereon and transmitting the other polarized light components therethrough. The polarized light components transmitted through the first mirror 33 are photoelectrically converted by the photodiode 34, and a photoelectrically converted light receiving signal is input to the laser light source 31. Accordingly, the laser light source 31 can control output adjustment of the laser light 30 or the like on the basis of feedback by the input light receiving signal.

The electro-optic deflector 39 is an element that can control irradiation positions of the laser light 30 to be in a distance of nanometers or so. The exposure device 3 can finely adjust irradiation positions of the laser light 30 irradiated onto the master base material 21 using the electro-optic deflector 39.

The moving optical table 42 includes the beam expander 43 and the objective lens 44. The laser light 30 led onto the moving optical table 42 is adjusted to have a desired beam shape by the beam expander 43, and then radiated onto the resist layer formed on the outer circumferential surface of the master base material 21 via the objective lens 44.

Here, while the master base material 21 is rotated using the turntable 46, the laser light 30 is moved in the axial direction (i.e., the direction of the arrow R) of the master base material 21, the laser light 30 is intermittently radiated onto the resist layer, and thereby light exposure is performed on the master base material 21. Movement of the irradiation positions of the laser light 30 may be performed in accordance with movement of the turntable 46, or performed in accordance with movement of a laser head including the laser light source 31.

In addition, the exposure device 3 includes the control mechanism 47 that controls irradiation times and irradiation positions of the laser light 30. The control mechanism 47 includes a formatter 48 and a driver 49 and controls irradiation times and irradiation positions of the laser light 30.

The driver 49 controls oscillation made by the laser light source 31 on the basis of a pulse signal having randomness generated by the formatter 48. In addition, the driver 49 synchronizes a pulse signal from the formatter 48 with a servo signal of the spindle motor 45 on each circumference so that light-exposed two-dimensional arrays are synchronized with each other on every circumference in the axial direction of the master base material 21. With the above-configured exposure device 3, pattern formation is performed on the master base material 21.

The master base material 21 exposed to light by the exposure device 3 can be used to produce the master 2 having the concave-convex structure 23 formed on the outer circumferential surface by going through the development process and the etching process as described above. Through the transfer of the master 2 produced as described above, the optical body 1 according to the present embodiment can be efficiently produced. Specifically, by using a transfer device 5 illustrated in FIG. 8, the optical body 1 onto which the concave-convex structure 23 formed on the outer circumferential surface of the master 2 is transferred can be continuously produced.

Figure 8:
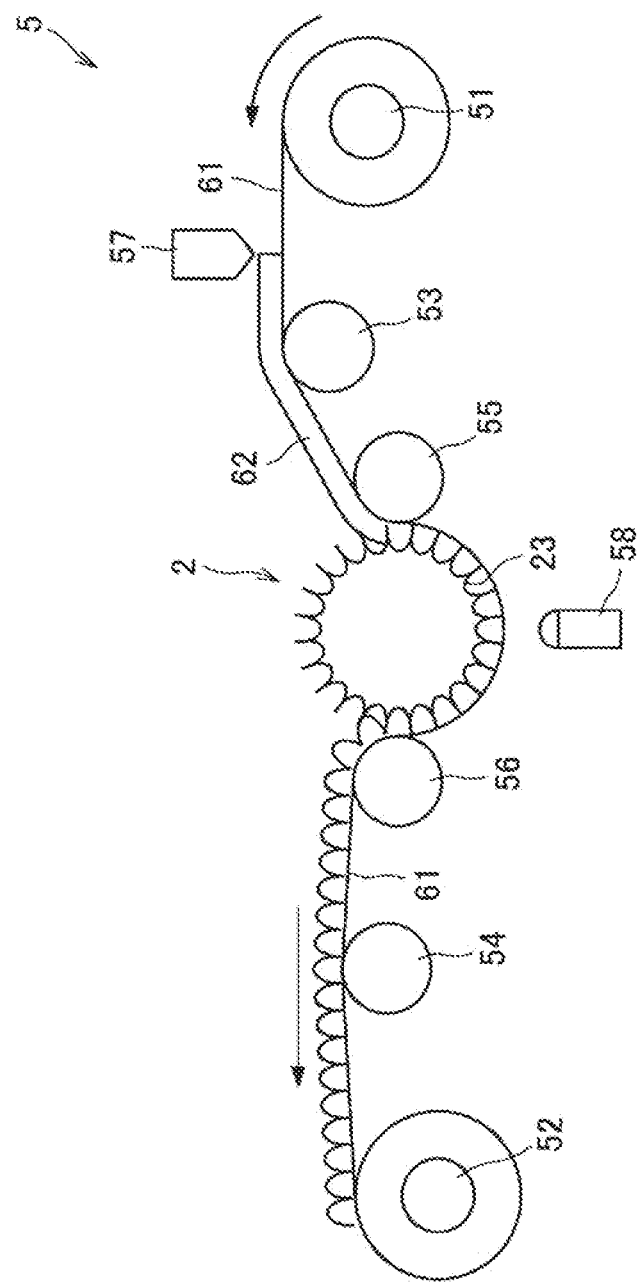
FIG. 8 is a schematic diagram illustrating a configuration of a transfer device producing an optical body according to an embodiment of the present invention.

The transfer device 5 for producing the optical body 1 according to the present embodiment will be described as follows with reference to FIG. 8. FIG. 8 is a schematic diagram illustrating a configuration of the transfer device 5 for producing the optical body 1 according to the present embodiment.

As illustrated in FIG. 8, the transfer device 5 includes the master 2, a base material supply roll 51, a winding roll 52, guide rolls 53 and 54, a nip roll 55, a separating roll 56, a coating device 57, and a light source 58. That is, the transfer device 5 illustrated in FIG. 8 is a roll-to-roll nano-imprinting transfer device.

The base material supply roll 51 is, for example, a roll in which the base material 11 in a sheet form is wound in a roll shape, and the winding roll 52 is a roll to wind the optical body 1 in which a resin layer 62 onto which the concave-convex structure 23 (i.e., an inverted structure of the micro concave-convex structure 13) has been transferred is laminated. In addition, the guide rolls 53 and 54 are rolls to transport the base material 11 that has not gone through a transfer or the optical body 1. The nip roll 55 is a roll to press the base material 11 on which the resin layer 62 has been laminated onto the master 2, and the separating roll 56 is a roll to separate the optical body 1 on which the resin layer 62 has been laminated from the master 2 after the concave-convex structure 23 is transferred to the resin layer 62.

The coating device 57 includes a coating means such as a coater and coats a photocurable resin composition onto the base material 11 to form the resin layer 62. The coating device 57 may be, for example, a gravure coater, a wire bar coater, or a die coater, or the like. In addition, the light source 58 is a light source that emits light having a wavelength at which a photocurable resin composition can harden, and may be, for example, an ultraviolet lamp or the like. Note that the resin layer 62 may be formed of a thermosetting resin composition.

Note that the photocurable resin composition is a resin that hardens when light having a predetermined wavelength is radiated thereto. Specifically, the photocurable resin composition may be a UV curable resin such as acrylic resin acrylate or epoxy acrylate. In addition, the photocurable resin composition may contain an initiator, a filler, a functional additive, a solvent, an inorganic material, a pigment, an antistatic agent, a sensitizing dye, or the like if necessary.

In the transfer device 5, first, the base material 11 is consecutively sent out from the base material supply roll 51 via the guide roll 53. The coating device 57 coats the photocurable resin composition on the sent base material 11 to laminate the resin layer 62 on the base material 11. In addition, the base material 11 on which the resin layer 62 has been laminated is pressed to the master 2 by the nip roll 55. Accordingly, the concave-convex structure 23 formed on the outer circumferential surface of the master 2 is transferred to the resin layer 62. The resin layer 62 to which the concave-convex structure 23 has been transferred hardens through irradiation of light from the light source 58. Accordingly, the micro concave-convex structure 13 is formed on the resin layer 62. The optical body 1 on which the micro concave-convex structure 13 has been formed is separated from the master 2 by the separating roll 56 and sent out to the winding roll 52 via the guide roll 54 to be wound.

With the above-described transfer device 5, the optical body 1 with the micro concave-convex structure 13 formed on the surface by transferring the concave-convex structure 23 formed on the outer circumferential surface of the master 2 thereto can be efficiently produced.

EXAMPLES

The optical body according to the present embodiment will be described below in more detail with reference to Examples and Comparative Examples thereof. Note that Example that will be introduced below is merely a condition example to show feasibility and an effect of the optical body and a manufacturing method thereof according to the present embodiment, and the optical body and the manufacturing method thereof according to the present invention is not limited to the following examples.

First Experiment Examples

Example 1

An optical body according to Example 1 was produced in the following process. First, a resist layer was formed of a material containing tungsten oxide on an outer circumferential surface of a master base material (a length in an axial direction of 480 m×an outer diameter of 132 mm), which is formed of cylindrical quartz glass, to have a thickness of about 50 to 60 nm using the sputtering method. Next, thermal reaction lithography with laser light was performed using an exposure device to form latent images on the resist layer.

Exposure patterns were arranged such that circular dots were arranged to form rows (tracks) at each pitch of about 230 nm in the circumferential direction of the master base material and to have a hexagonal grid shape in which an interval between adjacent dots is about 150 nm (i.e., adjacent tracks alternately deviate by a half pitch). Exposure was performed using a pulse signal obtained by further randomly phase-modulating a rectangular wave used for exposure of the exposure patterns (having a frequency of 27 MHz and a duty ratio of 60%) at 17% of a period.

Next, by performing development processing on the exposed master base material using NMD 3 (2.38 mass % of a tetramethylammonium hydroxide aqueous solution) (manufactured by Tokyo Ohka Kogyo Co., Ltd.), the resist on which the latent images had been formed was dissolved, and thereby a dot-arrayed concave-convex structure was formed on the resist layer. Next, reactive ion etching (RIE) was performed using CHF3 gas (30 sccm) at gas pressure of 0.5 Pa with input power of 200 W to etch the master base material for 60 to 120 minutes using the resist layer as a mask.

In the above-described process, the master with the concave-convex structure formed on the outer circumferential surface was produced. Furthermore, the optical body was produced using the produced master. Specifically, the concave-convex structure formed on the outer circumferential surface of the master was transferred to a UV curable resin using the transfer device and thereby the optical body according to Example 1 was produced. In addition, a polyethylene terephthalate film was used for the base material of the optical body, and the UV curable resin hardened through irradiation of ultraviolet rays of 1000 mJ/cm$^2$ from a metal halide lamp for 1 minute. Note that a planar array of convexities or concavities of the produced optical body was a substantially hexagonal array.

Example 2

A master was produced using a similar method to that of Example 1 except that a phase modulation amount of a pulse signal used in exposure was set to 11% of a period. In addition, an optical body to which the concave-convex structure formed on an outer circumferential surface of the master was transferred was produced using the similar method to that of Example 1. Note that a planar array of convexities or concavities of the produced optical body was a substantially hexagonal array.

Example 3

A master was produced using a similar method to that of Example 1 except that a period and a duty ratio of a pulse signal used in exposure were randomly modulated. In addition, an optical body to which the concave-convex structure formed on an outer circumferential surface of the master was transferred was produced using the similar method to that of Example 1. Note that a planar array of convexities or concavities of the produced optical body was a random array.

Comparative Example 1

A master was produced using a similar method to that of Example 1 except that a pulse signal used in exposure was not phase-modulated and was used as a periodic signal. In addition, an optical body to which the concave-convex structure formed on an outer circumferential surface of the master was transferred was produced using the similar method to that of Example 1. Note that a planar array of convexities or concavities of the produced optical body was a hexagonal array.

Comparative Example 2

A master was produced using a similar method to that of Example 1 except that a phase modulation amount of a pulse signal used in exposure was set to 8% of a period. In addition, an optical body to which the concave-convex structure formed on an outer circumferential surface of the master was transferred was produced using the similar method to that of Example 1. Note that a planar array of convexities or concavities of the produced optical body was a substantially hexagonal array.

(Evaluation Result)

Surface shapes of the optical bodies according to Examples 1 to 3 and Comparative Examples 1 and 2 produced as described above were evaluated using an atomic force microscope (AFM). A perspective diagram of the surface shape of the optical body according to Example 2 measured using the AFM is illustrated in FIG. 9 as a representative example.

Note that the surface shape of a region of 2 square μm of the optical body was measured using SPA 400 (manufactured by Hitachi High-Tech Science Corporation) for the AFM in a dynamic focus mode at a scan speed of 0.7 Hz. As a probe, SI-DF40P2 having a tip curvature radius of 7 nm and a spring constant of 26 N/m was used.

Figure 9:
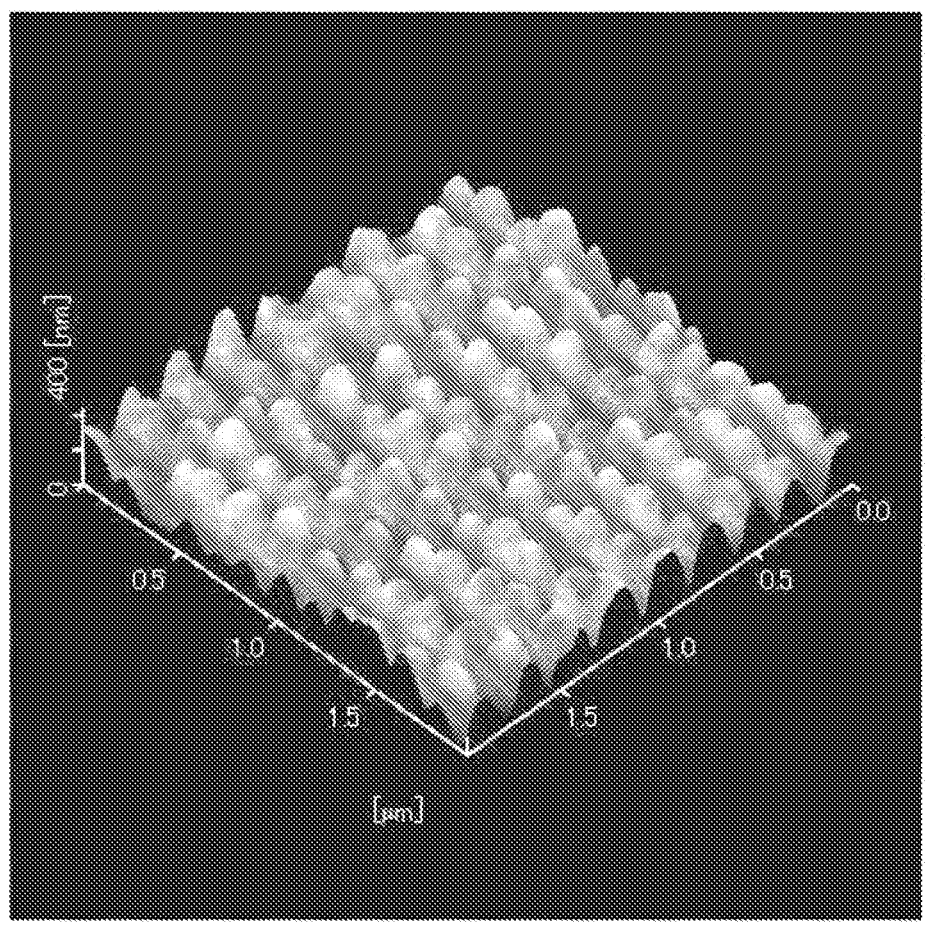
FIG. 9 is a perspective diagram expressing a surface shape of an optical body according to Example 2 measured using an AFM.

It can be ascertained referring to FIG. 9 that the optical body according to Example 2 has convexities periodically arrayed in a two-dimensional hexagonal grid array. In addition, it is ascertained that heights of the convexities are not uniform and are uneven at each convexity.

In addition, straight lines passing through the respective vertexes of convexities were extracted from central tracks of a measurement region of each of the optical bodies and cross-sectional shapes of the optical bodies having the straight lines as cutting lines were calculated. In the above-described calculation method, the heights of the convexities, the standard deviation of the differences between positions of the vertexes and the median of the positions of the vertexes of the convexities, and the standard deviation of the differences between the positions of the bottom faces and the median of the positions of the bottom faces of the concavities were calculated using the calculated cross-sectional shape. The calculation results are shown in Table 1 below.

Next, optical characteristics of the optical bodies according to Examples 1 to 3 and Comparative Examples 1 and 2 were evaluated using a spectrophotometer. The evaluation results are shown in Table 1 below.

Figure 10:
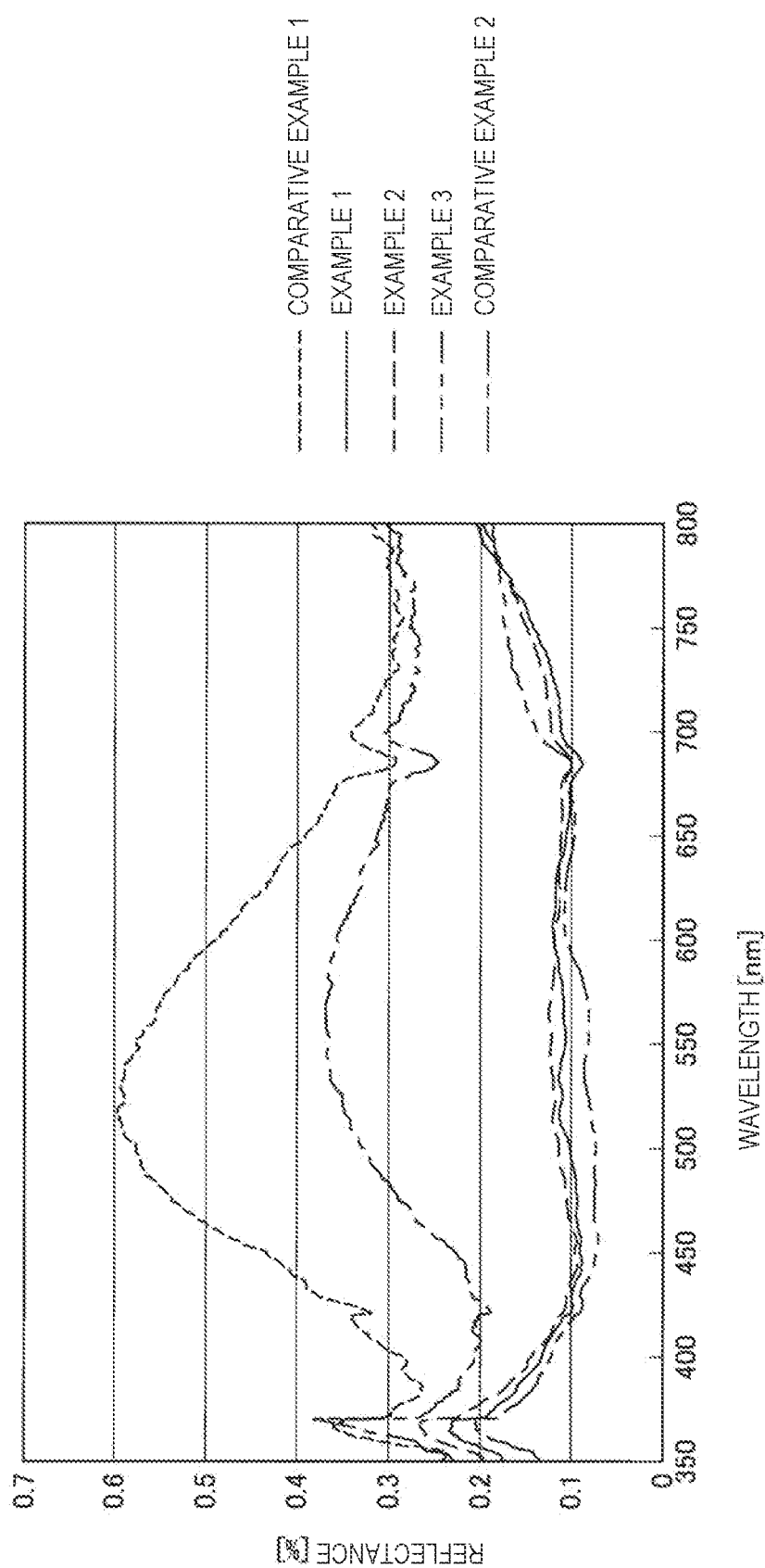
FIG. 10 is a graph chart in which reflectances of optical bodies according to Examples 1 to 3 and Comparative Examples 1 and 2 are evaluated at each wavelength of incident light.

Note that V550 (manufactured by JASCO Corporation) was used as the spectrophotometer, and ARV474S (manufactured by JASCO Corporation) was used as an absolute reflectance measuring instrument. In a regular reflection measurement mode, regular reflection of incident light at an angle of 5° was measured at a wavelength resolution of 1 nm in the range from 350 nm to 800 nm. The result thereof is shown in FIG. 10. FIG. 10 is a graph chart in which reflectances of the optical bodies according to Examples 1 to 3 and Comparative Examples 1 and 2 are evaluated at each wavelength of incident light.

In addition, luminous reflectance (which will also be referred to as a Y value) and reflection hues (a*, b*) were calculated using a tone of regular reflection light. Here, the luminous reflectance (Y value) is (Y, x, y) when the color of the regular reflection light is expressed in the Yxy color system and represents that regular reflection is suppressed further as the luminous reflectance (Y value) becomes smaller. In addition, the reflection hues (a*, b*) are (L*, a*, b*) when the color of reflected light is expressed in a L* a* b* color system and represent that reflected light is closer to white with lesser color as the values of the reflection hues (a*, b*) get closer to 0.

Note that, in Table 1, the "unevenness in concavities" represents the standard deviation of the differences between the respective positions of the bottom faces of the concavities in the normal direction of the flat surface of the base material and the median of the positions of the bottom faces, and the "unevenness in convexities" represents the standard deviation of the differences between the respective positions of the vertexes of the convexities in the normal direction of the flat surface of the base material and the median of the positions of the vertexes.

TABLE 1

| Pulse signals | Comparative example 1 | Example 1 | Example 2 | Example 3 | Comparative example 2 |
|---|---|---|---|---|---|
| | Periodic signal | Phase modulation at 17% of period | Phase modulation at 11% of period | Random signal | Phase modulation at 8% of period |
| Heights of convexities [nm] | 254.9 | 202.8 | 225.6 | 244.4 | 252.5 |
| Unevenness in concavities [nm] | 6.5 | 50.3 | 31.3 | 47.2 | 16.6 |
| Unevenness in convexities [nm] | 9.5 | 43.1 | 38.8 | 46.7 | 32.7 |
| Average reflectance in the range from 380 to 780 nm [%] | 0.42 | 0.12 | 0.12 | 0.11 | 0.30 |
| Y value[%] | 0.54 | 0.11 | 0.12 | 0.09 | 0.35 |
| a* | −2.21 | −0.02 | −0.16 | 0.23 | −0.86 |
| b* | 1.33 | 0.24 | 0.26 | 0.14 | 1.63 |

Referring to Table 1 and FIG. 10, it is ascertained that the optical bodies according to Examples 1 to 3 have unevenness (standard deviation) in the concavities greater than or equal to 25 nm and reflectances thereof are low through the wavelength band from 350 nm to 800 nm. On the other hand, it is ascertained that the optical bodies according to Comparative Examples 1 and 2 have unevenness (standard deviation) in the concavities less than 25 nm and thus reflectances thereof are particularly higher in the wavelength band from 450 nm to 600 nm than in other wavelength bands. Therefore, it is ascertained that the optical bodies according to Examples 1 to 3 have the absolute values of the reflection hues a* and b* smaller than those in Comparative Examples 1 and 2 to be equal to or smaller than 1 and thus reflected light has no color.

In addition, it is ascertained that the optical bodies according to Examples 1 to 3 have average reflectances in the range from 380 nm to 780 nm and luminous reflectances (Y values) that are lower than those of the optical bodies according to Comparative Examples 1 and 2 and both are equal to or lower than 0.2%. Therefore, it is ascertained that the optical bodies according to Examples 1 to 3 can suppress reflection more than the optical bodies according to Comparative Examples 1 and 2.

Figure 11:
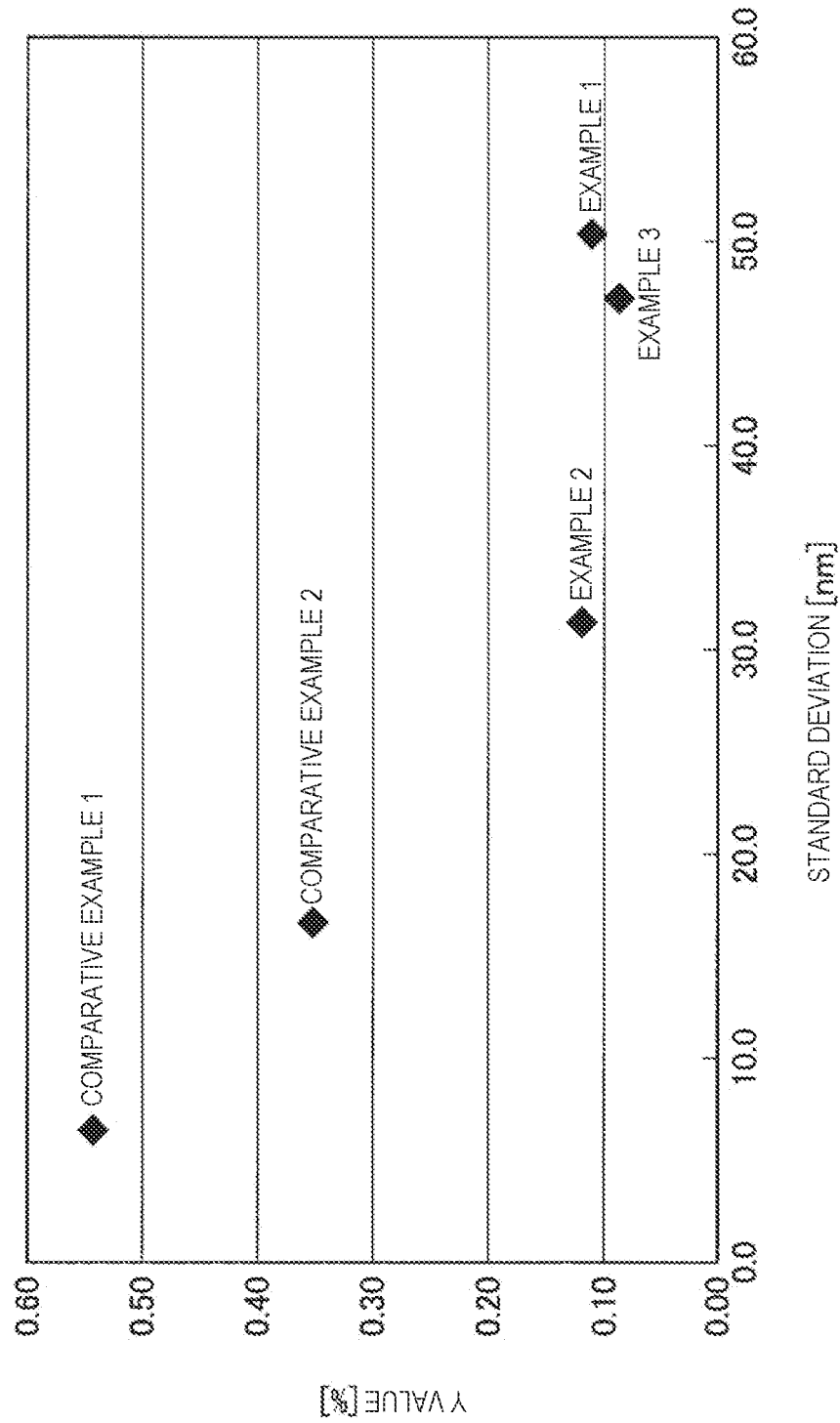
FIG. 11 is a scatter diagram illustrating correlations between standard deviations of differences between positions of bottom faces of concavities of optical bodies and a median of the positions of the bottom faces and Y values of the optical bodies.

Here, correlations between the unevenness in the concavities and Y values that are the luminous reflectances of Examples 1 to 3 and Comparative Examples 1 and 2 are illustrated in FIG. 11. FIG. 11 is a scatter diagram in which the horizontal axis represents the standard deviation of the differences between the positions of the bottom faces and the median of the positions of the bottom faces of the concavities of each optical body and the vertical axis represents the Y value.

As illustrated in FIG. 11, it is ascertained that the Y value decreases as the unevenness in the positions of the bottom faces of the concavities in the normal direction of the flat surface of the optical body becomes greater and thus reflection can be further suppressed. In addition, it is ascertained that, in the case in which the standard deviation is greater than or equal to 25 nm, the decrease of the Y value due to the increasing unevenness in the positions of the bottom faces of the concavities in the normal direction of the flat surface of the optical body reaches saturation. Therefore, it is ascertained with respect to the optical body according to the present embodiment that the Y value that is a luminous reflectance can be dramatically reduce by setting the standard deviation of the positions of the bottom faces of the concavities in the normal direction of the flat surface of the optical body to be greater than or equal to 25 nm.

Second Experiment Examples

Example 4

An optical body according to Example 4 was produced in the following process. First, similarly to Example 2, formation or a resist, light exposure, and development were performed on a master base material to form the concave-convex structure (i.e., the micro concave-convex structure) on a resist layer. Note that a phase modulation amount of a pulse signal used in the exposure was set to 11% of a period.

Next, an inorganic resist layer formed of $SiO_2$ was formed on the resist layer on which the micro concave-convex structure has been formed to have a thickness of 1000 nm. Note that the inorganic resist layer was formed through oxygenated sputtering using a Si target. Successively, using a diluted solution of P4210 that is a novolac resin (manufactured by AZ) with acetone at a ratio of 20 times (mass ratio), atomized P4210 was sprayed on the inorganic resist layer through spray coating. Accordingly, an organic resist layer having the macro concave-convex structure was formed on the inorganic resist layer. Note that an average period of concavities and convexities of the macro concave-convex structure was approximately longer than or equal to 1 µm, which was longer than a wavelength belonging to the visible light band.

Thereafter, reactive ion etching was performed using $CHF_3$ gas (30 sccm) and $CHF_4$ gas (30 sccm) at gas pressure of 0.5 Pa with input power of 200 W to etch the inorganic resist layer for 30 minutes using the organic resist layer as a mask. Next, reactive ion etching was performed using CHF3 gas (30 sccm) at gas pressure of 0.5 Pa with input power of 200 W to etch the master base material for 60 to 120 minutes using the inorganic resist layer and the resist layer as masks.

Through the above-described process, a master on which the macro concave-convex structure and the micro concave-convex structure were formed in a superimposing manner was produced on an outer circumferential surface. Furthermore, an optical body was produced using the produced master in a similar method to that of Example1.

Comparative Example 3

A master was produced in a similar method to that of Example 4 except that a pulse signal used in exposure was used as a periodic signal without change with no phase modulation. In addition, an optical body was produced using the produced master in a similar method to that of Example 1.

(Evaluation Result)

Figure 12:
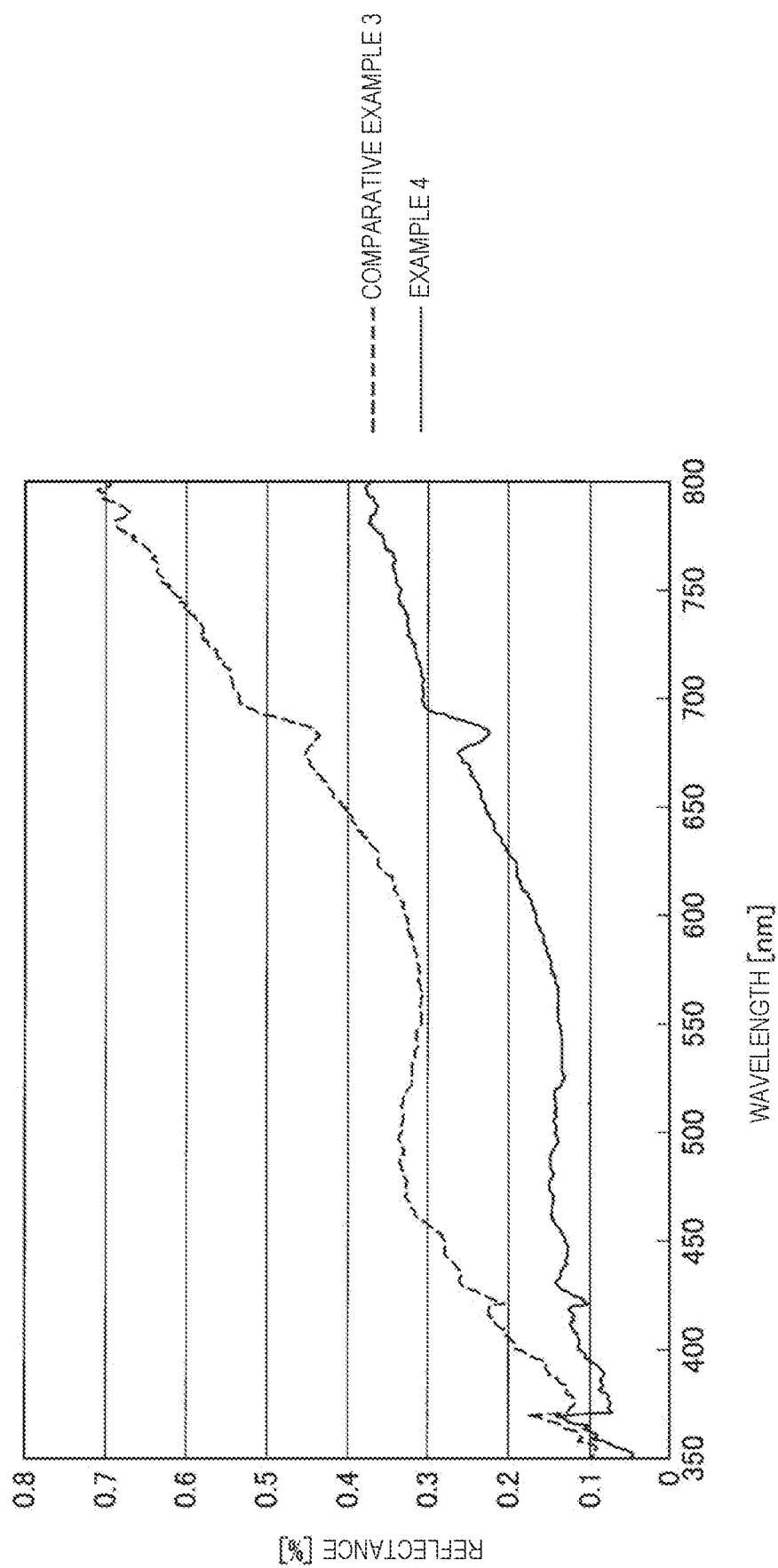
FIG. 12 is a graph chart in which reflectances of optical bodies according to Example 4 and Comparative Example 3 are evaluated at each wavelength of incident light.

Next, reflectances of the optical bodies according to Example 4 and Comparative Example 3 were evaluated using a spectrophotometer. Note that similar measurement method and measurement device for reflectances to those of the first experiment example were used. The evaluation results are shown in FIG. 12. FIG. 12 is a graph chart in which reflectances of the optical bodies according to Example 4 and Comparative Example 3 are evaluated at each wavelength of incident light.

As illustrated in FIG. 12, it is ascertained that, even if the optical body according to Example 3 is an optical body in which the macro concave-convex structure of which the average period of the concavities and convexities is longer than wavelengths belonging to the visible light band is superimposed on the micro concave-convex structure of which the average period of the concavities and convexities is equal to or shorter than wavelengths belonging to the visible light band, the optical body according to Example 3 can further reduce a reflectance through the wavelength band from 350 nm to 800 nm than the optical body according to Comparative Example 4. Since the optical body according to Example 3 has a reflectance reduction effect attributable to the micro concave-convex structure and an antiglare effect attributable to the macro concave-convex structure, the optical body can dramatically improve visibility of a display plane of a display device or the like when the optical body is used for the display plane.

As described above, the optical body 1 according to the present embodiment can suppress reflection of incident light beams having various wavelengths by increasing unevenness in the positions of the bottom faces of the concavities 133 of the micro concave-convex structure 13 in the normal direction of the flat surface 12 of the base material 11. Thus, by reducing the wavelength dependence of a reflectance, the optical body 1 according to the present embodiment can lower the reflectance over a wide wavelength band. Accordingly, the optical body 1 according to the present embodiment can prevent reflected light from having color.

Since the optical body 1 according to the present embodiment has low wavelength dependence and a lower reflectance, the optical body can dramatically improve visibility of a display plane of a display device or the like, for example, when the optical body is used for the display plane.

The preferred embodiment(s) of the present invention has/have been described above with reference to the accompanying drawings, whilst the present invention is not limited to the above examples. A person skilled in the art may find various alterations and modifications within the scope of the appended claims, and it should be understood that they will naturally come under the technical scope of the present invention.

REFERENCE SIGNS LIST

1 optical body
2 master
11 base material
12 flat surface
13 micro concave-convex structure
14 macro concave-convex structure
21 master base material
23 concave-convex structure
131 convexity
133 concavity
141 peak
143 valley

The invention claimed is:
1. An optical body comprising:
a concave-convex structure formed on a surface of a base material,
wherein an average period of concavities and convexities of the concave-convex structure is equal to or shorter than a wide wavelength band including a visible light band, a standard deviation of differences between respective positions of bottom faces of all the concavities of the concave-convex structure in a normal direction of a flat surface of the base material and a median of the positions of all the bottom faces is greater than or equal to 25 nm, and a standard deviation of differences between respective positions of vertexes of all the convexities of the concave-convex structure in the normal direction of the flat surface of the base material and a median of the positions of all the vertexes is greater than or equal to 35 nm.

2. The optical body according to claim 1,
wherein a Y value that is a luminous reflectance of the optical body is equal to or lower than 0.2%, and
the absolute values of reflection hues a* and b* of the optical body are equal to or smaller than 1.

3. The optical body according to claim 1, wherein an average reflectance of the optical body in a wavelength band from 380 nm to 780 nm is equal to or lower than 0.2%.

4. The optical body according to claim 1, further comprising:
a macro concave-convex structure formed on the surface of the base material to be superimposed on the concave-convex structure,
wherein an average period of concavities and convexities of the macro concave-convex structure is longer than a wavelength belonging to the visible light band.

5. The optical body according to claim 1, wherein a planar array of the convexities or concavities of the concave-convex structure is a hexagonal grid shape or a square grid shape.

6. The optical body according to claim 1, wherein a planar array of the convexities or concavities of the concave-convex structure is a random array.

7. A display device comprising:
the optical body according to claim 1.

8. The optical body according to claim 1,
wherein respective positions of the bottom faces of the concavities of the concave- convex structure in the normal direction of the flat surface of the base material vary randomly, and respective positions of the vertexes of the convexities of the concave-convex structure in the normal direction of the flat surface of the base material vary randomly.

9. The optical body according to claim 1,
wherein the standard deviation of differences between respective positions of the bottom faces of the concavities of the concave-convex structure in the normal direction of the flat surface of the base material and the median of the positions of the bottom faces is greater than or equal to 25 nm and less than or equal to 200 nm, and the standard deviation of differences between respective positions of the vertexes of the convexities of the concave-convex structure in the normal direction of the flat surface of the base material and the median of the positions of the vertexes is greater than or equal to 35 nm and less than or equal to 200 nm.

* * * * *